Nov. 21, 1939.   H. E. BRANDT   2,180,664
DISPENSING TANK CLOSURE STRUCTURE
Filed June 5, 1936
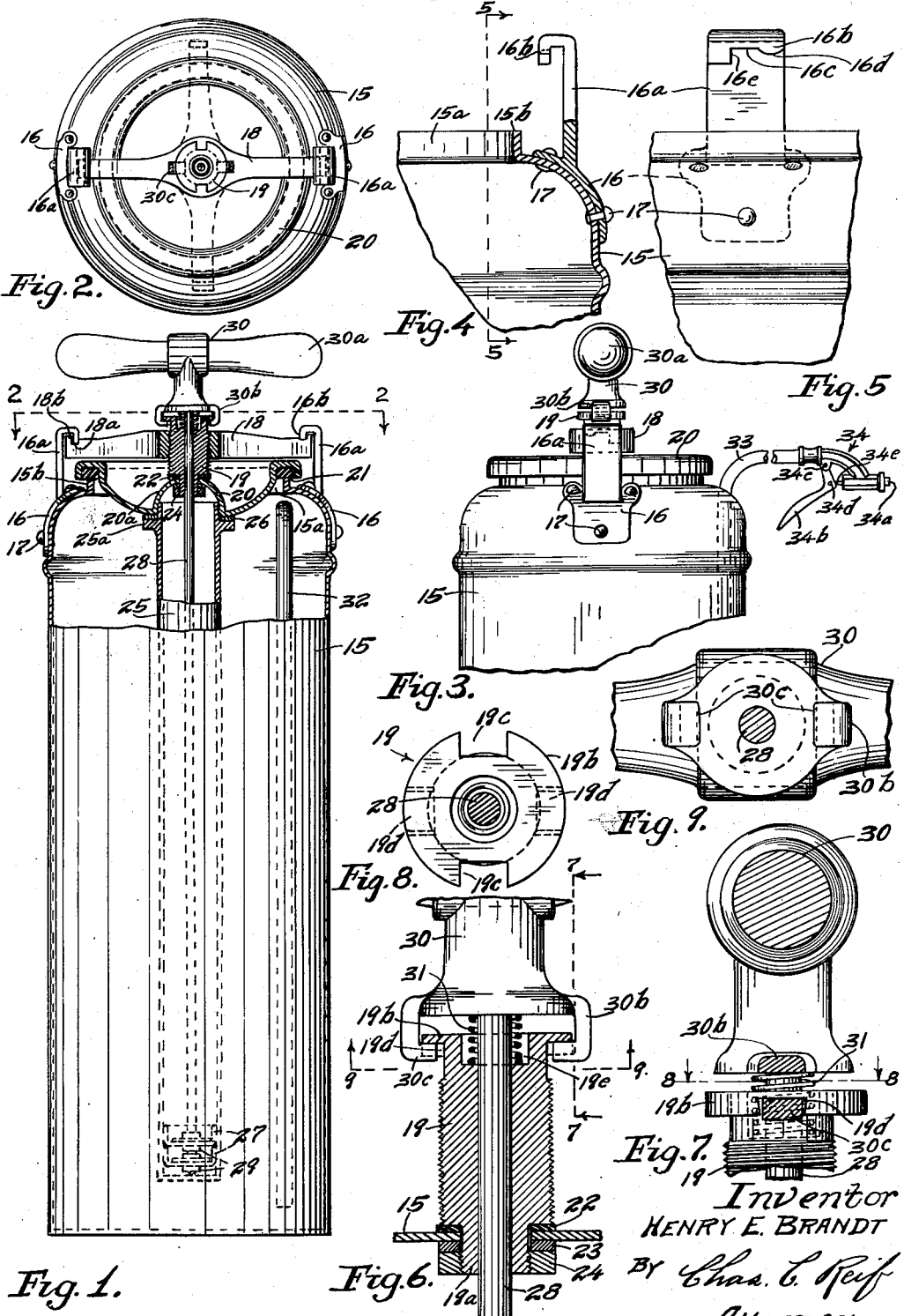
Inventor
HENRY E. BRANDT
By Chas. C. Reif
Attorney Patented Nov. 21, 1939

2,180,664

UNITED STATES PATENT OFFICE 2,180,664

DISPENSING TANK CLOSURE STRUCTURE

Henry E. Brandt, North St. Paul, Minn., assignor to Dobbins Manufacturing Company, North St. Paul, Minn., a corporation of Minnesota Application June 5, 1936, Serial No. 83,660

18 Claims. (Cl. 221—77)

This invention relates to a sprayer, such as used to spray insecticides, and particularly to a novel structure for the upper end or closure portion of said container.

Such sprayers usually comprise a container which is generally in the form of an upright cylinder. It is desirable to have a large opening at the top of the container so that it can be easily cleaned when the cover is removed. When the sprayer is in operation the cover for said opening must be held tightly in closed position. Such sprayers also usually comprise an air pump for placing the liquid to be sprayed under pressure and a handle is provided which is adapted to be used to operate the air pump as well as to carry the sprayer.

It is an object of this invention to provide a sprayer having a container with a comparatively large opening at its upper end and a simple and efficient closure means for said opening.

It is another object of the invention to provide a sprayer having a container with an opening at its upper end, a cover for said opening together with means for holding said cover tightly in closed position, which means may be quickly operated to release and remove said cover.

It is still another object of the invention to provide a sprayer structure comprising a container having an opening at its upper end, a cover for said opening, a threaded means for pressing said cover to closed position, said sprayer also comprising a pump cylinder, a plunger rod extending through said threaded means and having a handle at its upper end, said handle being adapted to engage said threaded means to turn the same and to carry said container and being adapted to be released from said threaded means so as to be reciprocated to operate said air pump.

It is still a further object of the invention to provide a sprayer structure comprising a container having an opening at its upper end, a cover for said opening, a member extending transversely of said cover above the same, means on said container releasably engaged by the ends of said member to prevent vertical movement thereof, together with a plug threaded through said said member and engageable with said cover to press the same to closed position.

These and other objects and advantages of the invention will be fully set forth in the following description made in connection with the accompanying drawing, in which like reference characters refer to similar parts throughout the several views and in which:

Fig. 1 is a view partly in side elevation and partly in central vertical section through a sprayer device;

Fig. 2 is a horizontal section taken substantially on line 2—2 of Fig. 1 as indicated by the arrows;

Fig. 3 is a partial view in side elevation of the sprayer device as seen from the right of Fig. 1;

Fig. 4 is a partial view similar to Fig. 1;

Fig. 5 is a vertical section taken on line 5—5 of Fig. 4 as indicated by the arrows, Figs. 4 and 5 being shown on an enlarged scale;

Fig. 6 is a partial view similar to Fig. 1;

Fig. 7 is a view in vertical section taken on line 7—7 of Fig. 6 also showing the handle of the sprayer;

Fig. 8 is a horizontal section taken on line 8—8 of Fig. 7 as indicated by the arrows; and Fig. 9 is a horizontal section taken on line 9—9 of Fig. 6, certain parts being omitted, said section being taken as indicated by the arrows. Figs. 6 to 9 are shown on an enlarged scale.

Referring to the drawing, a sprayer device is shown comprising a container 15 adapted to contain the liquid to be sprayed. While this container might be of various forms, in the embodiment of the invention illustrated it is shown as in the form of an upright cylinder having a rounded upper end and having a comparatively large circular opening 15a in its top, which opening is surrounded by an upstanding flange 15b. Container 15 has lugs 16 secured to either side thereof, the same being shown as having a portion fitting the curved top of said container and secured thereto by the rivets 17. Each lug 16 has an upstanding rectangular portion 16a having its upper end bent inwardly at a right angle and then bent downwardly to form the depending portion 16b. Said depending portions each have a slot or recess 16c in the central portion thereof, said recess extending upwardly therein. At one side of recess 16c the edge of said depending portion is of convexly curved formation as shown at 16d. Said depending portions have vertical side edges 16e at one side of recess 16c as shown in Fig. 5. A bar-like member 18 is provided which extends between portions 16a and has recesses 18a extending downwardly therein adjacent its ends forming upwardly projecting tongues 18b at the ends of said bar or member. Said bar 18 is adapted to be positioned as shown in Fig. 1 with the portions 16b disposed in recesses 18a, said bar being of a width to be received in the recesses 16c. Bar 18 will be held from vertical movement by engagement with the members 16. Bar 18 has a widened central portion and a member or plug 19 is threaded through this widened central portion. A cover 20 is provided for container 15, said cover having an annular channel adjacent its edge directed downwardly, in which channel is disposed a gasket 21. Gasket 21 engages the top of flange 15b so that a very tight closure can be had for opening 15a. Cover 20 extends downwardly from its edge portion in substantially semi-spherical form so as to be somewhat dish-shaped and the same has an upstanding smaller substantially semi-spherical central portion 20a having a somewhat flattened top. Plug 19 has a reduced portion 19a extending through a central opening in portion 20a and said plug has at its bottom a fibre washer 22 engaging the top of cover 20. A washer 23 surrounds reduced portion 19a and engages the underside of cover 20 and a nut 24 is threaded on reduced portion 19a so that cover 20 is secured to plug 19. Plug 19 is, however, rotatable in cover 20. Plug 19 has an outwardly extending cylindrical flange 19b at its upper end, which flange has slots 19c extending vertically therethrough, said slots having vertical parallel sides. Flange 19b also has formed therein at opposite sides thereof, dove-tailed recesses or slots 19d, which slots are circumferentially spaced from slots 19c and shown as disposed about 90 degrees therefrom. Slots or recesses 19d extend upwardly from the lower side of flange 19b. A pump cylinder 25 is threaded into the lower side of cover 20 and into portion 20a, said pump cylinder having a peripheral flange 25a at its upper end engaging a gasket washer 26 disposed between said flange and the underside of cover 20. Pump cylinder 25 has therein the usual cup-shaped plunger 27 which will be made of leather or similar yielding material and a plunger rod 28 is secured to plunger 27 by any suitable clamping means, such as the nuts 29. Plunger rod 28 extends upwardly from pump cylinder 25, through plug 19 and has secured to its upper end a handle member 30 having oppositely extending rounded handle bars 30a. Handle member 30 has a central cylindrical portion, from opposite sides of which extend outwardly and downwardly, lugs 30b, said lugs having inturned lower portions 30c. The ends of portions 30c are so spaced that they can be moved downwardly through slots 19c and they may be disposed in the recesses 19d as shown in Figs. 6 and 7. A coiled compression spring 31 surrounds plunger rod 28 and is seated in a recess 19e in the top of plug 19. Spring 31 is engaged at times by the bottom of handle member 30. A tube 32 is secured in container 15 and extends to a point adjacent the bottom thereof, said tube having secured thereto outside of container 15 a flexible tube 33. A discharge nozzle 34 is secured to the end of tube 33, which may be of any usual and standard construction and of which it will only be necessary to consider the discharge end 34a and the operating hand lever 34b pivoted by pivot 34c and also pivotally connected by pivot 34d to a plunger 34e which is spring controlled and regulates the discharge of liquid from nozzle 34. Nozzle 34 forms no part of the present invention and further description thereof is deemed unnecessary.

In operation, the liquid will be placed in container 15. The bar 18 can be rotated or oscillated to bring its ends from beneath portions 16b of the lugs 16. Said bar together with lug 19, cover 20, the pump cylinder 25 and handle 30 can then be removed from container 15. The liquid can then be placed in the container through opening 15a. When the liquid is thus placed in the container, cover 20 is replaced in position and bar 18 is again oscillated to bring its ends under the portions 16b of lugs 16. Said bar has its ends seated in recess 16c and is rotated so that one side engages the side or surface 16e of lugs 16. The curved surface 16d facilitates the swinging of the bar under portion 16b and acts to cam the end of the bar into recess 16c.

Handle 30 is now disposed as shown in Figs. 6 and 7. The handle can be brought to this position by moving lugs 30b downwardly through slots 19c against the pressure of spring 31 and then rotating handle 30 until lugs 30b are in alinement with recesses 19d and then allowing the handle to rise under the influence of spring 31. Lugs 30b are now in the recesses 19d and plug 19 can be rotated by rotating handle 30. Rotation of handle 30 screws plug 19 downwardly in bar 18 and said plug presses on the top of cover 20. Upward movement of bar 18 is prevented by the lugs 16. Plug 19 rotates in cover 30 and the fibre washer 22 relieves the friction on top of cover 20. Cover 20 can thus be pressed downwardly very tightly so that gasket 21 engages flange 15b and a very tight closure is had for the container. Handle 30 can now be again pressed down against the pressure of spring 31 to bring lugs 30b below flange 19b. The handle will then be rotated and lugs 30b moved upwardly through slots 19c. This releases the handle so the same can now be reciprocated to operate plunger rod 28 and plunger 27 to operate the air pump and apply pressure to the top of the liquid in container 15. The lugs 30b can be brought into the position shown in Figs. 6 and 7 as already described and the sprayer can be carried to the desired point or carried along as the spraying is done. The operator holds the nozzle 34 and presses on the grip handle lever 34b. This opens the valve in nozzle 34 and the liquid is forced out by the air pressure through tube 32, tube 33 and nozzle 34 and is directed on the plants as desired. The opening 15a is quite large in diameter as compared to container 15 and the container can be thoroughly cleaned when cover 20 is removed. The opening is ample for the operator to get his hand and forearm into the container to clean it. The bar 18, cover 20 and pump cylinder 25 are all removed as a unit, together, of course, with handle 30.

From the above description it is seen that applicant has produced a very simple and efficient sprayer construction. A wide opening for the container is provided and the closure means can be quickly applied and easily operated. The handle can be quickly positioned either to operate the air pump or to carry the sprayer or to tighten the closure. The parts are comparatively few in number and are all rugged in construction and easily made. The device has been amply demonstrated in actual practice, found to be very successful and efficient and is being commercially made.

It will, of course, be understood that various changes may be made in the form, details, arrangement an proportions of the parts, without departing from the scope of applicant's invention, which generally stated, consists in a device capable of carrying out the objects above set forth in the parts and combinations of parts disclosed and defined in the appended claims.

What is claimed is:

1. A sprayer construction having in combination, a container having an opening at its upper end with a portion extending around said opening, a cover too large to enter said opening for closing said opening engaging the top of said portion around said opening, a member engageable with and removable from said container and extending over and disposed entirely above said cover, a plug threaded into said member and engaging said cover to press the same to closing position, a plump plunger rod extending through said plug and a handle secured to said plunger rod engageable with said plug for carrying said container and rotating said plug and releasable from said plug for reciprocating said plunger rod.

2. A device of the class described having in combination, a container having a comparatively wide opening at its upper end, a cover for closing said opening, a bar extending transversely of said cover and disposed entirely above the same, spaced means secured to said container at the sides thereof beneath which the ends of said bar are removably engaged, a member threaded into the central portion of said bar and engaging said cover to press the same tightly to closing position, a pump cylinder secured to the underside of said cover, a pump plunger rod extending from said cylinder through said member, said cover being imperforate save for the passage therethrough of a portion of said member, a handle secured to the upper end of said rod, said handle having means engageable with said member to carry said container and releasable therefrom to reciprocate said plunger rod.

3. A device of the class described having in combination, a container having an opening at its upper end, a cover for closing said opening and too large to enter said opening, a bar extending transversely of and disposed entirely above said cover, means on said container releasably engaged by the ends of said bar to hold the latter against vertical movement, a plug threaded into the central portion of said bar engageable with the top of said cover to press the same to closing position, said plug being secured to said cover to lift the same, a pump cylinder secured to said cover, a plunger in said cylinder, a plunger rod secured to said plunger and extending through said cover and plug, said plug being connected centrally to said cover.

4. A device of the class described having in combination, a container having an opening at its upper end, a cover for closing said opening and too great in diameter to pass through said opening, a bar extending transversely of and disposed entirely above said cover, means on said container releasably engaged by the ends of said bar to hold the later against vertical movement, a plug threaded into the central portion of said bar engageable with the top of said cover to press the same to closing position, said plug being secured centrally to said cover to lift the same, a pump cylinder secured to said cover, a plunger rod extending from said pump cylinder through said plug, a handle secured to said plunger rod and engageable with said plug to rotate the same said cover being imperforate save for the passage of a portion of said plug therethrough.

5. The structure set forth in claim 4, said plug having a flange at its upper end with a vertical slot therethrough at one side, said handle having a lug movable vertically through said slot and said flange having a recess in which said lug may be disposed to rotate said plug and resilient means engaging said handle urging the same to position to hold said lug in said recess.

6. The structure set forth in claim 4, said plug having a flange at its uper end, said flange having slots at its opopsite sides extending vertically therethrough, said handle having oppositely disposed lugs depending therefrom adapted to move through said slots, said flange having oppositely disposed recesses therein spaced circumferentially from said slots in which said lugs are adapted to be disposed.

7. A sprayer construction having in combination, a container having an opening at its upper end, a portion surrounding said opening, a cover too large in diameter to enter said opening for engaging the top of said portion for closing said opening, a member extending transversely of and entirely above said cover engageable with and releasable from said container, a plug threaded into said member having a reduced portion extending centrally through said cover and secured thereto, a non-frictional element between said plug and cover, a pump cylinder secured to the underside of said cover, a plug rod in said cylinder extending centrally through said plug and a handle member secured to said rod, said cover being removable from said container with said member, plug, pump cylinder and plunger rod by means of said handle.

8. A sprayer construction having in combination, a container having an opening at its upper end, an upstanding portion surrounding said opening, a cover too large in diameter to enter said opening having means engaging the top of said upstanding portion around said opening for closing said opening; a member engageable with and removable from said container extending transversely of and disposed entirely above said cover, a plug threaded into said member and secured centrally to said cover and means for rotating said plug to press said cover to closing position, said plug reacting against said member.

9. A device of the class described having in combination, a container having an opening at its upper end, a cover for closing said opening and engaging the top of said container around said opening, a member engageable with and removable from said container extending over said cover, a plug threaded into said member, secured to said cover and rotatable therein, and adapted to bear on said cover, a pump cylinder secured to the underside of said cover, a pump plunger rod extending through said plug and into said cylinder and a handle secured to said rod engageable with and disengageable from said plug for turning the same.

10. A device of the class described having in combination, a container having an opening at its upper end, a cover larger than said opening for closing said opening and engaging the top of said container around said opening, a member engageable with and removable from said container extending across and above said cover, a plug threaded into said member and engaging said cover, said plug having a reduced portion extending through and rotatable in said cover and secured to said cover; a pump cylinder carried by said cover and extending therefrom downwardly into said container, a plunger in said cylinder, a plunger rod secured to said plunger and extending upwardly through said plug and a handle secured to the upper end of said plunger rod.

11. A device of the class described having in combination, a container having an opening at its upper end, a cover for closing said opening engaging the top of said container around said opening, a member extending across and above said cover and held from vertical movement, a plug threaded into said member and engaging said cover to press the same to closing position, said plug having a reduced portion secured to and rotatable in said cover and a reciprocable handle engageable with and disengageable from said plug and carrying a pump plunger rod reciprocable through said plug.

12. A device of the class described, having in combination, a container having a comparatively large opening at its upper end with a portion extending about said opening, a gasket adapted to rest on said portion, a cover too large to pass through said opening engaging said gasket, a movable member engaging said cover to press the same against said gasket, means held from upward movement relative to said container but movable otherwise relative thereto engaged by said movable member and against which it reacts, a pump cylinder carried by said cover and extending downwardly therefrom into said container, a plunger rod for said cylinder extending upwardly through said cover and a handle secured to said plunger rod and adapted to operate said movable member.

13. A device of the class described having in combination, a container having a comparatively large opening at its upper end with a portion extending about said opening, a gasket adapted to rest on said portion, a cover engaging said gasket, a rotatable member having helical means thereon, a second member extending across said cover and adapted to be held from movement relative to said container having helical means engaged by said rotatable member, the latter reacting against said second member and being moved by said helical means to press said cover downwardly on said gasket, a pump cylinder carried by said cover and extending downwardly therefrom, a plunger rod for said cylinder extending upwardly through said cover and a handle secured to the upper end of said rod engageable with said rotatable member for carrying said container and rotating said rotatable member and releasable from said rotatable member for reciprocating said plunger rod.

14. A device of the class described having in combination, a container having an opening at its upper end with a portion extending about said opening, a gasket adapted to rest on said portion, a pump cylinder adapted to extend through said opening, means secured to said cylinder engaging said gasket to close said opening about said cylinder and being too large to pass through said opening, a rotatable member for pressing said means against said gasket, a second member extending across said first mentioned means and adapted to be held from vertical movement relative to said container and engaged by said rotatable member and against which it reacts when rotated, a plunger and plunger rod for said cylinder, said rod extending upwardly through said rotatable member and a handle secured to said plunger rod and adapted to engage said rotatable member to operate the same or to be released therefrom for reciprocating said rod.

15. A device of the class described having in combination, a container having a comparatively large opening at its upper end with a portion extending about said opening, a gasket adapted to engage the top of said portion, a cover engaging said gasket, a rotatable member engaging said cover and having helical means thereon, a second member adapted to be held from vertical movement relative to said container extending across said cover and engaged by said rotatable member, said rotatable member reacting against said second member and being moved by said helical means to press said cover downwardly on said gasket, a pump cylinder carried by said cover and extending downwardly therefrom, a plunger rod for said cylinder extending upwardly through said rotatable member and a handle secured to the upper end of said rod engageable with said rotatable member for carrying said container and rotating said rotatable member and releasable from said rotatable member for reciprocating said plunger rod.

16. A device of the class described having in combination, a container having an opening at its upper end with a portion extending around said opening, a gasket arranged to engage said portion, a cover too large to enter said opening for closing said opening and engaging the top of said gasket, a member engageable with and removable from said container and adapted to be held from upward movement relative to said container, a rotatable threaded plug engaging said member and said cover and threaded into one of the same adapted when rotated to react against said member and to press said cover against said gasket, a pump cylinder secured to said cover, a pump plunger rod extending through said plug and a handle secured to said plunger rod engageable with said plug for carrying said container and rotating said plug and releasable from said plug for reciprocating said plunger rod.

17. A device of the class described having in combination, a container having an opening at its upper end with a portion extending about said opening, a gasket adapted to engage the top of said portion, a pump cylinder adapted to pass through said opening, means secured to said cylinder for engaging said gasket and closing said opening about said cylinder and being too large to pass through said opening, a member separable from but adapted to be attached to said container and be held in stationary position relative thereto, rotatable means engaging said last mentioned means and reacting thereagainst when rotated to press said first mentioned means against said gasket, a plunger rod for said cylinder extending upwardly through said rotatable means and adapted to engage and rotate the same.

18. The structure set forth in claim 17, said handle being adapted to carry said container when engaged with said rotatable means and being releasable from said rotatable means for reciprocating said rod.

HENRY E. BRANDT.